(12) United States Patent
Kwon et al.

(10) Patent No.: US 6,214,585 B1
(45) Date of Patent: Apr. 10, 2001

(54) PROTEIN HYDROLYSIS

(75) Inventors: Steven Soon-Young Kwon; Dharam Vir Vadehra, both of New Milford, CT (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 08/180,194

(22) Filed: Jan. 11, 1994

Related U.S. Application Data

(63) Continuation of application No. 07/860,551, filed on Mar. 27, 1992, now abandoned, which is a continuation of application No. 07/377,522, filed on Jul. 7, 1989, now abandoned.

(51) Int. Cl.$^7$ ........................................ C12P 21/04
(52) U.S. Cl. ...................... 435/71.2; 435/252.1; 435/68.1
(58) Field of Search .................................. 435/71.2, 68.1, 435/252.1, 853

(56) References Cited

U.S. PATENT DOCUMENTS 4,110,477   8/1978   Naruse et al. ........................ 426/46

FOREIGN PATENT DOCUMENTS

0223560   *   5/1987   (EP) ...................................... 435/68.1

OTHER PUBLICATIONS

Ardö, et al. "Accelerated Cheese Ripening with Heat Treated Cells of Lactobacillus Heveticus and a Commercial Proteolytic Enzyme," *Journal of Dairy Research* (1989): 55, 239–245.

Cserhati, et al. "Use of Proteases of Microbial Origin in the Dairy Industry. Role of the Proteolytic Activity of Lactic Acid Bacteria in the Occurrence of the Bitter Taste Defect" (1973) (Abstract).

"Bergey's Manual of Determinative Bacteriology", Ed Buchanan et al. 1974, p. 582, Williams & Wilkins.*

Irescott & Dunn, "Industrial Microbiology", 1982, Avi Publ. Co.*

Bartels et al (I), *Milchwissenschaft*, vol. 42 1987, pp. 139–144.*

Bartels et al (II) *Milchwissenschaft*, vol. 42, 1987, pp. 83–88.*

Visser, F, Neth Milk Dairy, J., 1977, vol. 31, pp. 188–209.*

Frey et al, Milchwissenschaft, vol. 41, 1986, pp. 622–624.*

* cited by examiner

Primary Examiner—Irene Marx
(74) Attorney, Agent, or Firm—Vogt & O'Donnell, LL

(57) ABSTRACT

A slurry of enzymatically hydrolyzed protein containing polypeptides is incubated with a culture of a food-grade microorganism, particularly *Lactobacillus helveticus,* which produces peptidases to hydrolyze the polypeptides in the slurry.

24 Claims, No Drawings

PROTEIN HYDROLYSIS

CROSS REFERENCE TO RELATED APPLICATIONS

This application is a continuing application of application Ser. No. 07/860,551, filed Mar. 27, 1992, now abandoned, which, in turn, is a continuing application of application Ser. No. 07/377,522, filed Jul. 7, 1989, now abandoned.

BACKGROUND OF THE INVENTION

The present invention relates to a process of enzymatically hydrolysing protein material to give a hydrolysate which is substantially free of a bitter taste.

Hydrolysed proteins, which are widely used in the food industry, may be prepared by hydrolysis of protein material with acid, alkali or enzymes. However, on the one hand, acid or alkaline hydrolysis can destroy the essential amino acids produced during the hydrolysis thus reducing the nutritional value, whereas enzymatic hydrolysis with proteases rarely goes to completion so that the hydrolysed protein contains substantial amounts of peptides and, depending on the nature of the protein and the enzyme used for proteolysis, the peptides formed can have extremely bitter tastes and are thus organoleptically undesirable.

Various methods have been tried to overcome the problem of bitter tasting peptides. For instance, European Patent Application No. 223560 claims a method for flavour control of a protein hydrolysate which comprises selecting a proteinaceous feedstock, subjecting said feedstock to a primary enzymatic hydrolysis with a proteinase to produce a primary hydrolysate including bittering substances, characterised by subjecting said primary hydrolysate to a secondary enzymatic hydrolysis with an extract containing aminopeptidase enzymes, said secondary enzymatic hydrolysis acting to convert said bittering substances at least to flavour-neutral substances. Examples of proteinaceous feedstocks described are soya protein, gluten, whey protein, casein, haemoglobin, yeast extract, cereal proteins, milk, milk powder, skimmed milk, potato extracts and microbial derived proteins. The only method described for the production of the aminopeptidases is by extraction from *streptococcus lactis,* but this extract may contain contaminating protease which can further generate bitterness by hydrolysing any proteins left in the substrate.

We have found that some proteolysed cheese products, such as Swiss cheese or cheddar cheese, when subjected to hydrolysis with extracts of protease and aminopeptidase, retain their bitter taste.

SUMMARY OF THE INVENTION

We have now found a method of substantially removing the bitter taste from enzymatically hydrolysed proteins which comprises incubating them with live cultures of certain food-grade microorganisms.

Accordingly, the present invention provides a process for the debittering of an enzymatically hydrolysed protein containing bitter tasting polypeptides which comprises incubating a slurry of the enzymatically hydrolysed protein with a culture of a food-grade microorganism which is capable of producing peptidases which hydrolyse the bitter tasting polypeptides to give debittered substances.

DETAILED DESCRIPTION OF THE INVENTION

The enzymatically hydrolysed protein may be derived from the proteolysis by conventional methods of protein containing materials such as plant protein, chicken, meat, fish, casein, hard or soft cheese, e.g., Swiss cheese or cheddar cheese, whey protein or peptamen. During proteolysis, bitter tasting polypeptides are produced. It should be understood that in this invention, the protein hydrolysis and the debittering of the protein hydrolysate produced may be carried out sequentially or, if desired, substantially simultaneously by mixing the protein slurry with a proteolytic enzyme and with a culture of the food-grade microorganism and incubating together.

The food-grade microorganism may be selected from, for instance, yeasts, moulds, bacteria such as *streptococci, bacilli* or *lactobacilli,* preferably *Lactobacillus helveticus.* The food-grade microorganism may produce intracellular peptidases which may be secreted or may not be secreted in any substantial amount across the cell membrane. When the peptidases remain intracellular, it is thought that bitter tasting polypeptides permeate into the cells where they are hydrolysed by the peptidases to give debittered substances which are permeated back out of the cells into the slurry.

The peptidases produced by the food-grade microorganism are usually dipeptidase, tripeptidase, aminopeptidase and carboxypeptidase.

Advantageously, the food-grade microorganism may be heat-shocked before incubation, e.g., treated at 55°–70° C. for up to a few minutes to render the cell walls porous and to reduce their ability to produce acids from free sugar.

The enzymatically hydrolysed protein is conveniently used in a concentration of from 5 to 50% and preferably from 10 to 30% by weight of solids based on the total weight of the slurry.

The cell concentration of the food-grade microorganism is conveniently from $10^3$ to $10^{10}$ cells/g and preferably from $10^4$ to $10^8$ cells/g.

The incubation temperature is conveniently from 45° to 60° C. and from 50° C. to 60° C. The duration of the incubation is suitably from 4 to 30 hours, preferably from 10 to 24 hours and especially from 12 to 20 hours.

The pH during the incubation may be from 5 to 7.5 and preferably from 5.5 to 7.2, the optimal pH depending upon the nature of the substrate.

The incubation may be carried out without agitation but preferably the slurry is agitated, for example stirring from 50 to 300 rpm.

The debittered protein obtained by the process of this invention may be used as a material for the production of Maillard reaction meat flavours by reacting with suitable carbohydrates by methods well known to those skilled in the art.

After incubation, the debittered protein is pasteurised, e.g., at a temperature from 650 to 80° C. over a period of from 10 to 30 minutes, preferably with agitation or by high temperature short time treatment, followed by cooling. If desired, flavouring agents e.g., propionic acid, may be added to the slurry before or after pasteurisation.

The final product may be dried and, as such, can be stored at room temperature. If the final product is in the liquid form, it should be stored under frozen or refrigerated conditions depending on the length of storage desired.

EXAMPLES

The following Examples further illustrate the present invention. Parts and percentages are given by weight unless otherwise stated.

Example 1

Swiss cheese cubes were made into a 70% slurry (containing about 19% protein) in a food processor after adding water, 1.2% salt and 0.9% sodium citrate buffer to pH 5.8. Then protein hydrolysis and simultaneous debittering of the protein hydrolysate produced was carried out by mixing the slurry with a protease solution and a *Lactobacillus helveticus* culture at a cell concentration of $10^7$ cells/g which had been heat shocked by heat treating at 60° C. for 1 minute. The incubation was carried out at 45° C. for 16 hours without agitation.

After incubation, the debittered Swiss cheese flavour slurry was mixed with 1.5% propionic acid to improve the flavour and then pasteurised at 75° C. for 15 minutes with stirring, after which the product was finally packaged.

The product had a pleasant flavour completely free of bitterness.

Example 2

A 20% chicken broth hydrolysate slurry was incubated with a *Lactobacillus helveticus* culture at a cell concentration of $10^7$ cells/g at 45° C. for 16 hours at pH 6.2 with stirring at 200 rpm.

The product was pasteurised at 77° C. for 15 minutes with stirring and then cooled to less than 5° C. The product had a pleasant flavour free of bitterness.

Example 3

A 20% casein hydrolysate slurry was incubated with a *Lactobacillus helveticus* culture at a cell concentration of $10^7$ cells/g at 45° C. for 16 hours at pH 7.0 with stirring at 150 rpm.

The product was pasteurised at 70° C. for 15 minutes with stirring and cooled to less than 5° C. The product had a bland flavour free of bitterness.

Example 4

A 20% whey protein hydrolysate slurry obtained by alkaline proteolysis of whey protein was incubated with a *Lactobacillus helveticus* culture at a cell concentration of $10^7$ cells/g at 45° C. for 16 hours at pH 7.0 with stirring at 100 rpm.

The product was pasteurised at 70° C. for 15 minutes and then cooled to less than 5° C. It had a bland flavour free of bitterness.

Example 5

Soybean protein hydrolysate was made into a 10% solution in water and incubated with *Lactobacillus helveticus* culture for 8 hours at 55° C. at a pH in the range of from 6.5 to 7.0. At the end of the incubation, as well as being debittered there was also lack of beany notes in the product. The product was pasteurised at 70° C. for 15 minutes and used for the production of other flavour ingredients by reaction flavour technology.

What is claimed is:

1. A process for treating enzymatically hydrolyzed protein comprising mixing a *Lactobacillus helveticus* culture with a slurry of enzymatically hydrolyzed protein containing polypeptides, wherein the hydrolyzed protein is a hydrolysate selected from the group consisting of hydrolyzed plant protein, hydrolyzed meat protein and hydrolyzed fish protein, and incubating the mixture at a temperature of from 45° C. to 60° C. to obtain an incubated mixture containing debittered hydrolysate.

2. A process according to claim 1 further comprising enzymatically hydrolyzing protein to obtain the slurry of the hydrolyzed protein and adding the *Lactobacillus helveticus* culture during hydrolysis of the protein.

3. A process according to claim 1 further comprising heat-shocking the *Lactobacillus helveticus* culture and then mixing the heat-shocked culture with the slurry.

4. A process according to claim 3 wherein the culture is heat-shocked at a temperature of from about 55° C. to about 70° C.

5. A process according to claim 1 wherein the mixture is incubated at a temperature of from 50° C. to 60° C.

6. A process according to claim 1 wherein the the hydrolyzed protein is contained in the slurry in a concentration of from 5% to 50% by weight based on a total weight of the slurry.

7. A process according to claim 1 wherein the *Lactobacillus helveticus* culture mixed with the slurry has a concentration of from $10^3$ cells/g to $10^{10}$ cells/g.

8. A process according to claim 1 wherein the pH during incubation is from 5 to 7.5.

9. A process according to claim 1 further comprising agitating the mixture during incubation.

10. A process according to claim 9 wherein the mixture is agitated by stirring at from 50 rpm to 300 rpm.

11. A process according to claim 1 further comprising pasteurizing the debittered hydrolysate.

12. A process according to claim 1 wherein the mixture is incubated at a temperature of from 45° C. to 55° C.

13. A process for treating a cheese comprising enzymatically hydrolyzing a cheese thereby obtaining a hydrolysate including polypeptides, mixing a *Lactobacillus helveticus* culture with a slurry of the hydrolysate and incubating the mixture at a temperature of from 45° C. to 60° C. to obtain an incubated mixture containing debittered hydrolysate.

14. A process according to claim 13 further comprising heat-shocking the *Lactobacillus helveticus* culture and then mixing the heat-shocked culture with the slurry.

15. A process according to claim 14 wherein the culture is heat-shocked at a temperature of from 55° C. to 70° C.

16. A process according to claim 13 wherein the mixture is incubated at a temperature of from 50° C. to 60° C.

17. A process according to claim 13 further comprising pasteurizing the incubated mixture.

18. A process according to claim 13 wherein the mixture is incubated at a temperature of from 45° C. to 55° C.

19. A process for treating casein comprising enzymatically hydrolyzing casein to obtain a hydrolysate from the casein including polypeptides, mixing a *Lactobacillus helveticus* culture with a slurry of the hydrolysate and incubating the mixture at a temperature of from 45° C. to 60° C. to obtain an incubated mixture containing debittered hydrolysate.

20. A process according to claim 19 further comprising heat-shocking the *Lactobacillus helveticus* culture and then mixing the heat-shocked culture with the slurry.

21. A process according to claim 20 wherein the culture is heat-shocked at a temperature of from 55° C. to 70° C.

22. A process according to claim 19 wherein the mixture is incubated at a temperature of from 50° C. to 60° C.

23. A process according to claim 19 further comprising pasteurizing the incubated mixture.

24. A process according to claim 19 wherein the mixture is incubated at a temperature of from 45° C. to 55° C.

* * * * *